US007450307B2

(12) United States Patent
Tanaka et al.

(10) Patent No.: US 7,450,307 B2
(45) Date of Patent: Nov. 11, 2008

(54) LASER IRRADIATION APPARATUS, LASER IRRADIATION METHOD, AND METHOD FOR MANUFACTURING SEMICONDUCTOR DEVICE

(75) Inventors: Koichiro Tanaka, Atsugi (JP); Tomoaki Moriwaka, Atsugi (JP); Yoshiaki Yamamoto, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 326 days.

(21) Appl. No.: 10/915,438

(22) Filed: Aug. 11, 2004

(65) Prior Publication Data

US 2005/0055016 A1 Mar. 10, 2005

(30) Foreign Application Priority Data

Sep. 9, 2003 (JP) ............................... 2003-317049

(51) Int. Cl.
*G02B 27/10* (2006.01)
(52) U.S. Cl. ........................................ 359/618; 359/623
(58) Field of Classification Search .......... 359/618–624
See application file for complete search history.

(56) References Cited

U.S. PATENT DOCUMENTS

| | | | |
|---|---|---|---|
| 4,733,944 A * | 3/1988 | Fahlen et al. ................. | 359/624 |
| 5,948,291 A | 9/1999 | Neylan et al. | |
| 6,650,480 B2 | 11/2003 | Tanaka | |
| 6,690,515 B2 | 2/2004 | McCulloch et al. | |
| 6,890,839 B2 | 5/2005 | Kawaguchi et al. | |
| 2002/0021497 A1* | 2/2002 | McCulloch et al. .......... | 359/619 |
| 2002/0027716 A1* | 3/2002 | Tanaka ........................ | 359/621 |
| 2002/0126479 A1* | 9/2002 | Zhai et al. .................... | 362/244 |
| 2003/0132209 A1 | 7/2003 | Kawaguchi et al. | |
| 2003/0156269 A1* | 8/2003 | Komatsuda et al. ........... | 355/67 |

FOREIGN PATENT DOCUMENTS

| | | |
|---|---|---|
| CN | 1340849 | 3/2002 |
| JP | 10-256179 | 9/1998 |

OTHER PUBLICATIONS

Translation of JP10-256179 Entitled Laser Light Irradiation Device and Method.
Office Action (Application No. 200410079131.X) Dated Jun. 15, 2007.

* cited by examiner

*Primary Examiner*—Alicia M Harrington
(74) *Attorney, Agent, or Firm*—Eric J. Robinson; Robinson Intellectual Property Law Office, P.C.

(57) ABSTRACT

It is an object of the present invention to provide a laser irradiation apparatus, a laser irradiation method, and a method for manufacturing a semiconductor device using the laser irradiation method that can suppress the energy distribution of the laser beam. The present invention provides a laser irradiation apparatus including a laser oscillator oscillating a pulsed laser beam, a lens assembly having a plurality of optical systems, position control means for controlling the position of the lens assembly to select at least two from the plurality of optical systems in synchronization with oscillations of a plurality of pulses of the pulsed laser beam, wherein the selected plurality of optical systems forms a plurality of pulses with spatial energy distribution inverted or rotated.

34 Claims, 11 Drawing Sheets optical system 111 optical system 112 optical system 113 first pulse of pulsed laser beam second pulse of pulsed laser beam third pulse of pulsed laser beam fourth pulse of pulsed laser beam first pulse of pulsed laser beam second pulse of pulsed laser beam third pulse of pulsed laser beam fourth pulse of pulsed laser beam

LASER IRRADIATION APPARATUS, LASER IRRADIATION METHOD, AND METHOD FOR MANUFACTURING SEMICONDUCTOR DEVICE

BACKGROUND OF THE INVENTION

1. Field of the Invention

The present invention relates to a laser irradiation apparatus that can be used for crystallizing a semiconductor film. In addition, the present invention relates to a laser irradiation method and a method for manufacturing a semiconductor device that use the laser irradiation apparatus.

2. Related Art

A thin film transistor formed using a poly-crystalline semiconductor film (a poly-crystalline TFT) is superior in mobility by two digits or more compared to a TFT formed using an amorphous semiconductor film. Therefore, the poly-crystalline TFT has an advantage that a pixel portion and a peripheral driver circuit of a semiconductor display device can be integrally formed over a same substrate.

The poly-crystalline semiconductor film can be formed over an inexpensive glass substrate by using a laser annealing method. Lasers are classified broadly into two types of a pulsed laser and a continuous wave laser according to the oscillation method. The output power per unit time of the pulsed laser typified by an excimer laser is approximately three to six digits higher than that of the continuous wave laser. Therefore, the laser irradiation can be performed efficiently to the semiconductor film by shaping a beam spot (the region on the surface of the processing object where the laser beam is irradiated in fact) of a pulsed laser beam into an ellipse, a rectangle having a length of several cm on a side, or a line having a length of 100 mm or more through an optical system. That is to say, the pulsed laser has an advantage of high throughput.

In particular, even though the power of the laser beam fluctuates by several % between pulses of the pulsed laser beam, it is possible to prevent the crystallinity of the semiconductor film from varying due to the fluctuation of the power by using a square beam spot shaped so as to cover the whole pixel portion in the semiconductor display device. With the beam spot shaped thus, moreover, a portion of the semiconductor film having the inferior crystallinity formed by the edge portion of the beam spot can be prevented from forming in the pixel portion. Therefore, the crystallization can be performed uniformly by using the beam spot having the size large enough to cover the whole pixel portion. When the poly-crystalline semiconductor film obtained by this uniform crystallization is used as an active layer of TFT, the variation in the characteristic of TFT such as on-current and mobility can be suppressed.

However, it is considered that the laser crystallization can be performed uniformly by using such a square beam spot covering a comparatively wide range when the energy distribution of the laser beam is homogeneous. For example, in the case of the excimer laser, actually the energy distribution of the laser beam that is considered to be caused by the laser oscillator exists in the range of approximately 1% to 5% at the peak-to-valley value. The energy distribution of the laser beam causes the variation in the crystallinity of the semiconductor film. Moreover, the energy distribution is almost constant between pulses of the pulsed laser beam. Therefore, when the crystallization is performed by irradiating a plurality of pulses of a pulsed laser beam to the same region for the purpose of further enhancing the crystallinity, the variation in the crystallinity due to the energy distribution of the laser beam is amplified, which interrupts the homogeneity of the crystallinity. It is noted that the term "energy distribution" herein used means the energy distribution in the beam spot formed on the irradiated surface.

It is noted that when a beam homogenizer including a lens array with a plurality of lenses equipped and the like is provided in the optical path of the laser beam, the energy distribution of the laser beam can be homogenized to some extent. However, the beam homogenizer has its limits to homogenize the energy distribution, and it is difficult to homogenize completely the energy distribution. The more the number of lenses included in the lens array per unit area increases, the more homogenized the energy distribution of the laser beam can be when thinking from the viewpoint of the geometrical optics. In this case, however, when the number of lenses per unit area increases, the variation in the energy density of the laser beam due to the interference of the beam between the lenses is also amplified, and this may cause the periodic interference stripe. In addition, the lens is miniaturized, thereby requiring higher accuracy. Since the highly accurate lens is so expensive that this lens is not preferable to be employed in the optical system.

SUMMARY OF THE INVENTION

The present invention is made in view of the above problems, and it is an object of the present invention to provide a laser irradiation apparatus, a laser irradiation method, and a method for manufacturing a semiconductor device using the laser irradiation method that can suppress the energy distribution of the laser beam.

The present inventors considered that even though the energy distribution exists in one pulse of a pulsed laser beam, the variation in the crystallinity can be suppressed by changing the energy distribution between a plurality of pulses of a pulsed laser beam to be irradiated to the same region. In order to change the energy distribution, the present invention uses one of the following two methods: (A) using an optical system for changing the spatial energy distribution of at least one pulse among a plurality of pulses of a pulsed laser beam to be irradiated to the same region, or (B) changing a position where at least one pulse among a plurality of pulses of a pulsed laser beam to be irradiated to the same region is incident into the lens array of the beam homogenizer.

Specifically, according to the laser irradiation method (A), the spatial energy distribution of at least one pulse among all the pulses of the pulsed laser beam to be irradiated to the same region is inverted or rotated using an optical system. In addition, the pulse with the spatial energy distribution inverted and the pulse with the spatial energy distribution rotated may be combined.

Moreover, a laser irradiation apparatus using the laser irradiation method (A) includes a laser oscillator oscillating a pulsed laser beam, a lens assembly having a plurality of optical systems, and position control means for controlling a position of the lens assembly to select at least two from the plurality of optical systems in synchronization with oscillations of a plurality of pulses of the pulsed laser beam. The selected plurality of optical systems can form a plurality of pulses with the spatial energy distribution inverted or rotated each other from the aforementioned plurality of pulses. Moreover, the laser irradiation apparatus may have a beam homogenizer for homogenizing the spatial energy distribution of the plurality of the pulses that are inverted or rotated each other and for irradiating them to the same region.

Specifically, according to the laser irradiation method (B), when the energy distribution exists, the energy distribution of the laser beam which is incident into each lens of the lens array changes by changing the incidence position of the laser beam in the lens array. Thus, the energy distribution of the laser beam is different before and after the incidence position of the laser beam in the lens array changes.

In addition, a laser irradiation apparatus using the laser irradiation method (B) includes a laser oscillator oscillating a pulsed laser beam, a beam homogenizer having a lens array, and position control means for controlling an incidence position of the laser beam in the lens array by controlling the position of the lens array in synchronization with oscillations of a plurality of pulses of a pulsed laser beam. Moreover, the laser irradiation apparatus may have an optical system such as a condenser lens for irradiating the laser beam emitted from the lens array to the same region.

In the present invention, the total energy distribution of the laser beam to be irradiated to the same region is homogenized by employing the method (A) or (B). Furthermore, the total energy distribution can be homogenized further by combining the two methods (A) and (B).

It is the most efficient to change the energy distribution of every pulses in order to homogenize the total energy distribution. However, the present invention is not limited to this structure, and the spatial energy distribution of at least one pulse among a plurality of pulses of a pulsed laser beam to be irradiated to the same region may be changed.

The method for manufacturing a semiconductor device of the present invention can be applied to manufacture an integrated circuit and a semiconductor display device. Particularly, the present invention can be applied to the semiconductor element such as the transistor provided in the pixel portion of the semiconductor display device such as a liquid crystal display device, a light-emitting device having a light-emitting element, typically an organic light-emitting element, equipped in each pixel, a DMD (Digital Micromirror Device), a PDP (Plasma Display Panel), or an FED (Field Emission Display). In this case, it is possible to suppress the visible variation in brightness due to the energy distribution of the laser beam irradiated to the pixel portion. Particularly in the case of TFT, the variation in the characteristic of TFT such as on-current and mobility can be suppressed.

The present invention can be applied not only to the excimer laser but also to another pulsed laser such as a glass laser, a YAG laser, a $YVO_4$ laser, or a $GdVO_4$ laser. In addition, the present invention may be applied not only to the pulsed laser but also to the continuous wave laser.

[Advantageous Effect of the Invention]

According to the above structure of the present invention, even though the energy distribution exists in one pulse of a pulsed laser beam, the total energy distribution of the laser beams to be irradiated to the same region can be homogenized, and therefore the uniform annealing can be performed. When the above method is employed to crystallize the semiconductor film, the crystallinity of the semiconductor film can be homogenized.

In addition, the energy distribution of the laser beam which is incident into each lens of the lens array can be changed by changing the incidence position of the laser beam in the lens array. Therefore, the energy distribution on the irradiated surface can be changed.

DETAILED DESCRIPTION OF THE INVENTION

Hereinafter, an embodiment mode and embodiments of the present invention are explained with reference to the drawings. However, since the present invention can be embodied in many different modes, it is easily understood by those skilled in the art that the modes and the details of the present invention can be changed and modified in various ways unless such changes and modifications depart from the scope and the content of the present invention hereinafter defined. Thus, the present invention is not limited to the description of the embodiment modes.

EMBODIMENT MODE 1

Figure 1A:
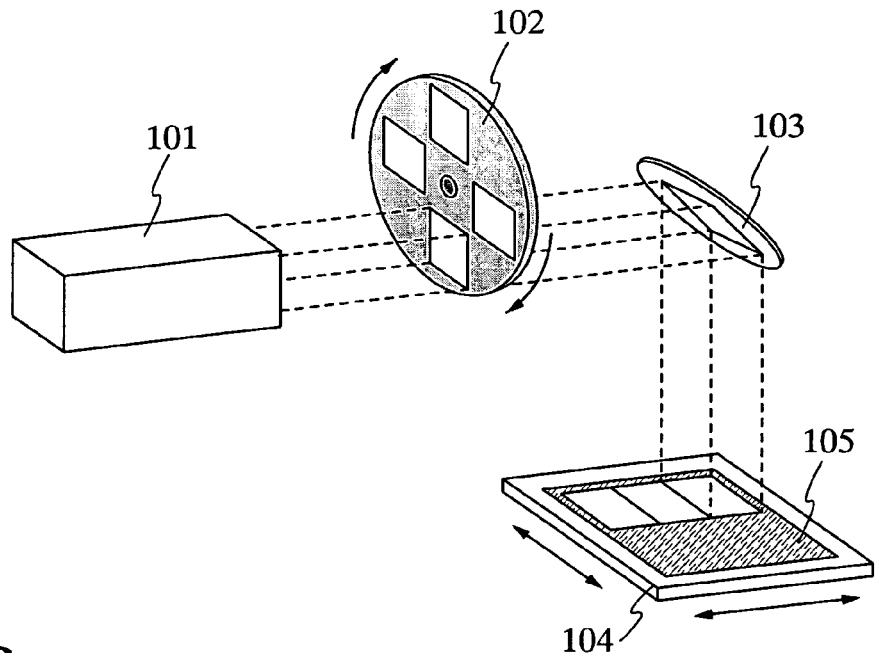
FIGS. 1A and 1B are drawings for showing a structure of the laser irradiation apparatus of the present invention.

A structure of the laser irradiation apparatus of the present invention is explained with reference to FIGS. 1A and 1B. A laser irradiation apparatus shown in FIG. 1A includes a laser oscillator 101 oscillating a pulsed laser beam, a lens assembly 102 including an optical system for inverting or rotating the energy distribution of the pulse selected from the pulses of a pulsed laser beam emitted from the laser oscillator 101, an optical system 103 for changing the direction of the optical path of the laser beam emitted from the lens assembly 102, and a stage 104 for mounting a processing object 105 (herein means a substrate with a semiconductor film formed thereover).

It is noted that although FIG. 1A shows a mirror as the optical system 103 for changing the direction of the optical path of the laser beam, another optical system may be used instead of the mirror.

In addition, although not illustrated in FIG. 1A, the laser irradiation apparatus of the present invention has means for controlling the position of the stage 104. It is noted that the laser irradiation apparatus shown in FIG. 1A uses a processing object moving method in which an irradiation position of the laser beam is fixed while the substrate 105 moves. However, the present invention is not limited to this method. An irradiation system moving method in which the substrate 105, which is the processing object, is fixed while the irradiation position of the laser beam moves may be employed. Moreover, these two methods may be combined.

The lens assembly 102 includes a plurality of optical systems for inverting or rotating the energy distribution of the laser beam. FIG. 1B is an enlarged view of the lens assembly 102. The plurality of optical systems in the lens assembly 102 changes the spatial energy distribution between the pulses of the pulsed laser beam. Specifically, four optical systems 110 to 113 are provided in FIG. 1B.

The optical system 110 emits the laser beam without changing the energy distribution of the incident laser beam. The optical system 111 emits the laser beam after inverting the energy distribution of the incident laser beam along a dotted line 121. The optical system 112 emits the laser beam after inverting the energy distribution of the incident laser beam along a dotted line 122 as well as the optical system 111. It is noted that these dotted lines in the optical systems 111 and 112, which are the axes of the inversion, intersect each other. The optical system 113 emits the laser beam after rotating the energy distribution of the incident laser beam by 180°.

Figure 1B:
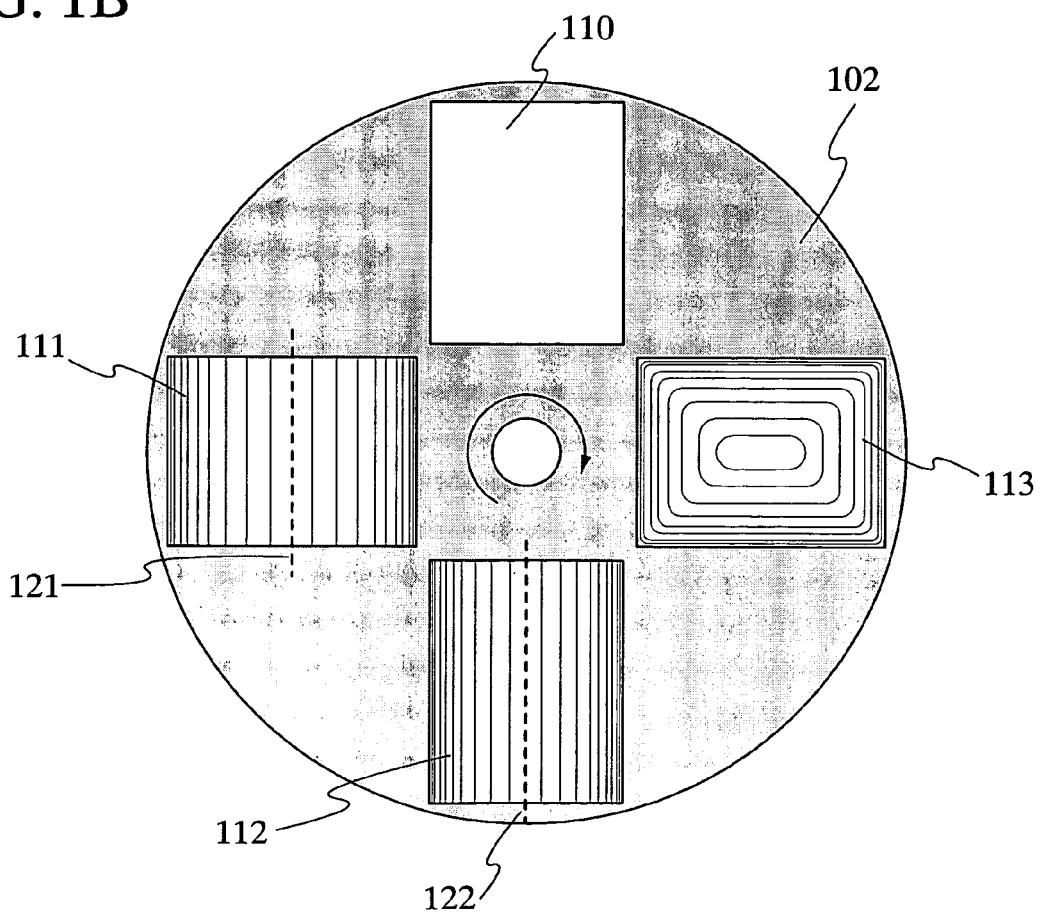

In FIGS. 1A and 1B, the incidence position of the laser beam in the lens assembly 102 is controlled by rotating the lens assembly 102 and any one of the optical systems 110 to 113 is selected. Although not illustrated in FIG. 1A, the laser irradiation apparatus of the present invention has position control means for controlling the incidence position of the laser beam in the lens assembly 102. The optical system selected from the lens assembly 102 controls the energy distribution of the laser beam on the irradiated surface.

Although FIG. 1A shows the structure in which the incidence position of the laser beam in the lens assembly 102 is controlled by rotating the lens assembly 102, the present invention is not limited to this structure when the optical systems 110 to 113 are selected in synchronization with the frequency of the pulsed laser beam.

Moreover, although the four optical systems 110 to 113 are used in FIG. 1B, the number of optical systems for controlling the energy distribution is not limited to four. At least two optical systems that can differ the relative energy distributions each other may be used. Of course, three optical systems or five or more optical systems may be also used.

Figure 2A:
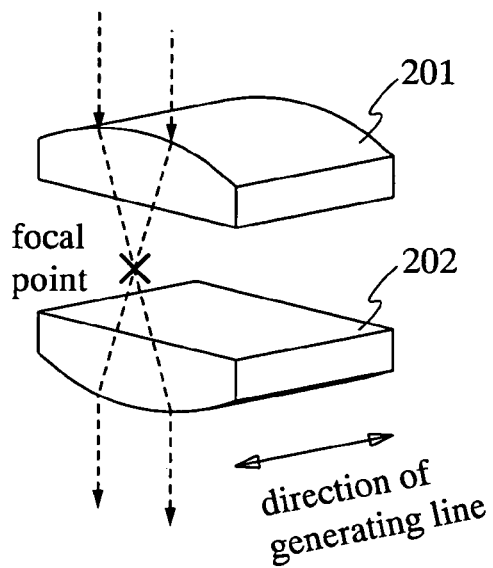
FIGS. 2A to 2C are drawings for showing optical systems used in the lens assembly.

Next, the structures of the three optical systems 111 to 113 that can invert or rotate the energy distribution are explained in detail. FIG. 2A shows one example of the optical system 111. The optical system 111 shown in FIG. 2A has two cylindrical lenses 201 and 202. The direction of the generating line of the cylindrical lens 201 is the same as that of the cylindrical lens 202 as indicated by an arrow of a continuous line. The cylindrical lenses 201 and 202 are arranged so that the incident laser beam, which is drawn by a dotted arrow, is focused between the two cylindrical lenses. With the above structure, the energy distribution of the laser beam emitted therefrom is inverted along the generating line. The generating line described in this specification indicates a generating line located at a curved portion of the cylindrical lens that is the furthest from the plane portion of the cylindrical lens.

Figure 2B:
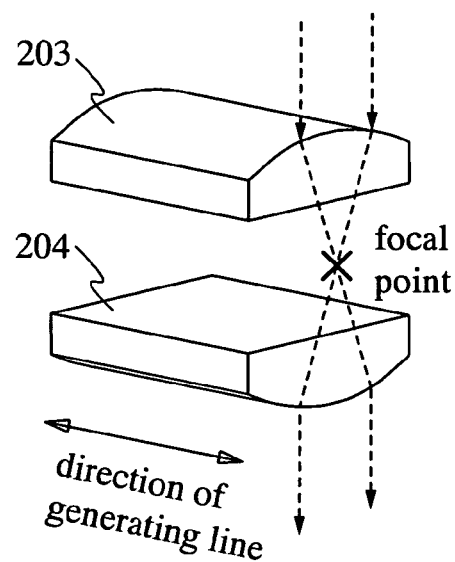

FIG. 2B shows an example of the optical system 112. The optical system 112 shown in FIG. 2B has two cylindrical lenses 203 and 204 as well as in FIG. 2A. The direction of the generating line of the cylindrical lens 203 is the same as that of the cylindrical lens 204 as indicated by an arrow of a continuous line. The cylindrical lenses 203 and 204 are arranged so that the incident laser beam, which is drawn by a dotted arrow, is focused between the two cylindrical lenses. With the above structure, the energy distribution of the laser beam emitted therefrom is inverted along the generating line. It is noted that the direction of the generating line of the optical system 112 shown in FIG. 2B is different from that of the optical system 111 shown in FIG. 2A. Specifically, it is preferable that these two directions intersect at an angle nearer 90° in order to change the energy distribution largely.

Figure 2C:
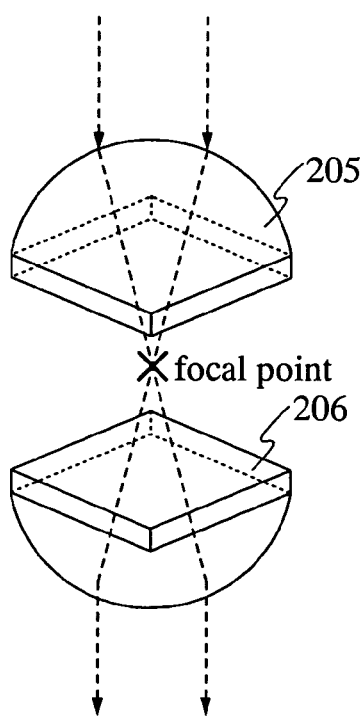

FIG. 2C shows an example of the optical system 113. The optical system 113 shown in FIG. 2C has two planoconvex spherical lenses 205 and 206. The planoconvex spherical lenses 205 and 206 are arranged so that the incident laser beam, which is indicated by a dotted arrow, is focused between the two planoconvex spherical lenses 205 and 206. With the above structure, the energy distribution of the laser beam emitted therefrom rotates around the focal point by 180°.

Figure 4A:
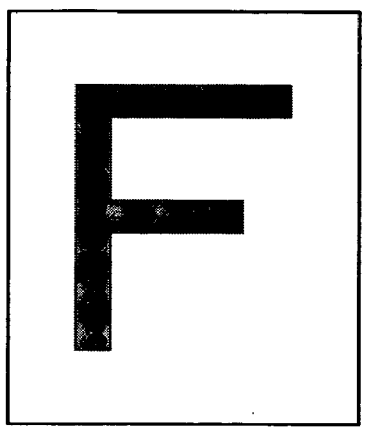
FIGS. 4A to 4D are drawings for showing schematically the energy distribution of the laser beam emitted from the lens assembly.
Figure 4B:
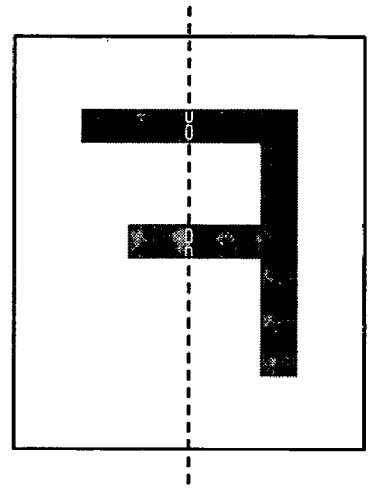
Figure 4C:
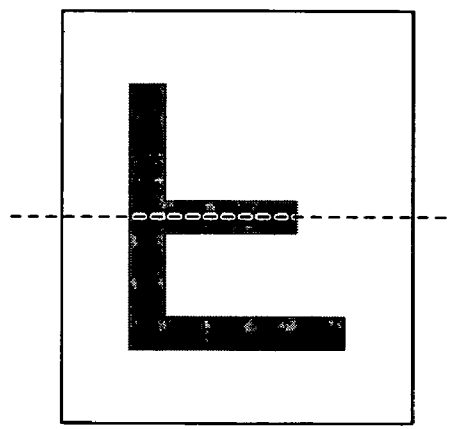
Figure 4D:
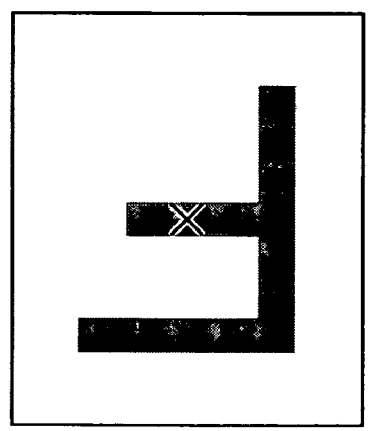

FIGS. 4A to 4D show schematically the energy distribution of the laser beam emitted from each of the optical systems 110 to 113 when the lens assembly 102 shown in FIG. 1B is used. It is assumed that the laser beam emitted from the optical system 110 has the energy distribution shown in FIG. 4A. On this occasion, the energy distribution of the laser beam emitted from the optical system 111 is inverted along a dotted line as shown in FIG. 4B so as to be symmetrical to the energy distribution as shown in FIG. 4A with respect to the dotted line. In addition, the energy distribution of the laser beam emitted from the optical system 112 is inverted along a dotted line as shown in FIG. 4C so as to be symmetrical to the energy distribution as shown in FIG. 4A with respect to the dotted line. It is noted that these two dotted lines in FIGS. 4B and 4C intersect each other. In addition, the energy distribution of the laser beam emitted from the optical system 113 rotates by 180° as shown in FIG. 4D.

Uniform annealing can be performed in such a way that the spatial energy distribution is homogenized by irradiating four pulses of the pulsed laser beam having the spatial energy distribution shown in FIGS. 4A to 4D to the same region. It is noted that all the pulses having the different spatial energy distributions respectively obtained by the lens assembly are not always irradiated to the same region. For example, three among the four pulses shown in FIGS. 4A to 4C may be irradiated to a certain region, and three among the four pulses shown in FIGS. 4B to 4D may be irradiated to another region.

It is noted that the optical systems shown in FIGS. 2A to 2C are just an example of the optical system for inverting or rotating the energy distribution. The present invention is not limited to those shown in FIGS. 2A to 2C.

Figure 3A:
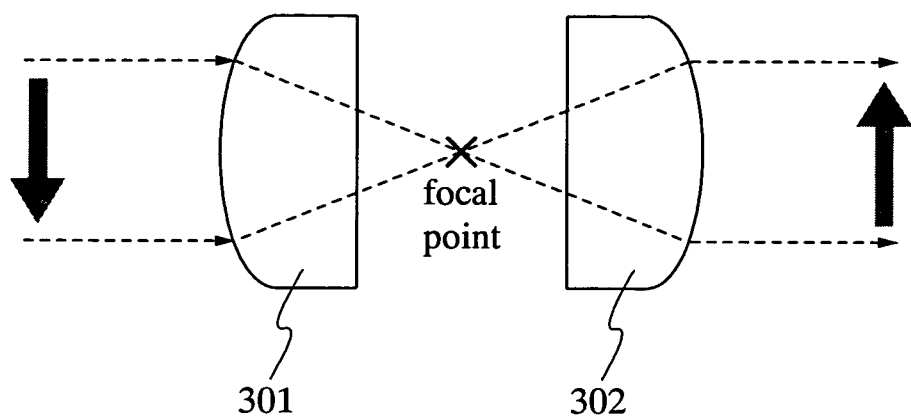
FIGS. 3A and 3B are drawings for showing the relation between the number of focal points and the inversion of the image.

In addition, although the optical systems shown in FIGS. 2A to 2C use two lenses respectively, the number of lenses is not limited to this. The number of lenses may be determined so that the energy distribution is inverted by forming odd number of focal points. FIG. 3A is a cross-sectional view of two convex lenses 301 and 302 and also shows an image formed by the convex lenses 301 and 302. When a focal point is formed between the convex lenses 301 and 302 as shown in FIG. 3A, an inverted image is formed.

Figure 3B:
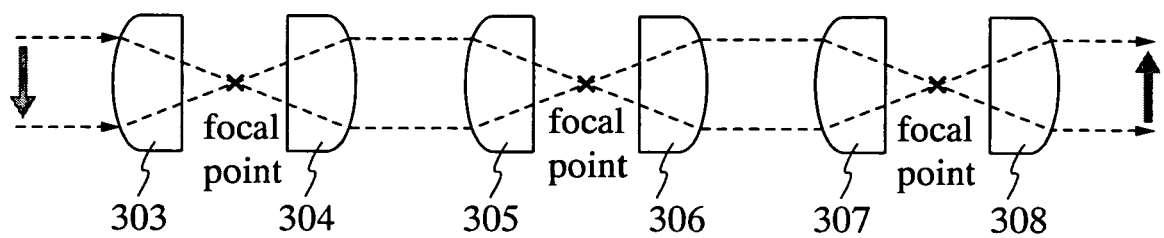

FIG. 3B is a cross-sectional view of six convex lenses 303 to 308 and also shows an image formed by the convex lenses 303 to 308. When focal points are formed between the convex lenses 303 and 304, between the convex lenses 305 and 306, and between the convex lenses 307 and 308 respectively as shown in FIG. 3B, an inverted image is formed because the number of focal points is three, which is the odd number.

It is noted that the optical system for inverting or rotating the energy distribution is not always limited to the shown example in which only the convex lens typified by the cylindrical lens or the planoconvex spherical lens is used. Besides, a prism or a fresnel lens may be used in combination.

Next, a structure of the laser irradiation apparatus of the present invention which is different from that shown in FIG. 1A is explained with reference to FIG. 5. The laser irradiation apparatus shown in FIG. 5 has a laser oscillator 401 oscillating a pulsed laser beam, a beam homogenizer 402 into which the pulsed laser beam oscillated from the laser oscillator 401 is incident, an optical system 403 for changing the direction of the optical path of the laser beam emitted from the beam homogenizer 402, and a stage 404 for mounting a processing object 405 (herein means a substrate with a semiconductor film formed thereover).

Figure 5:
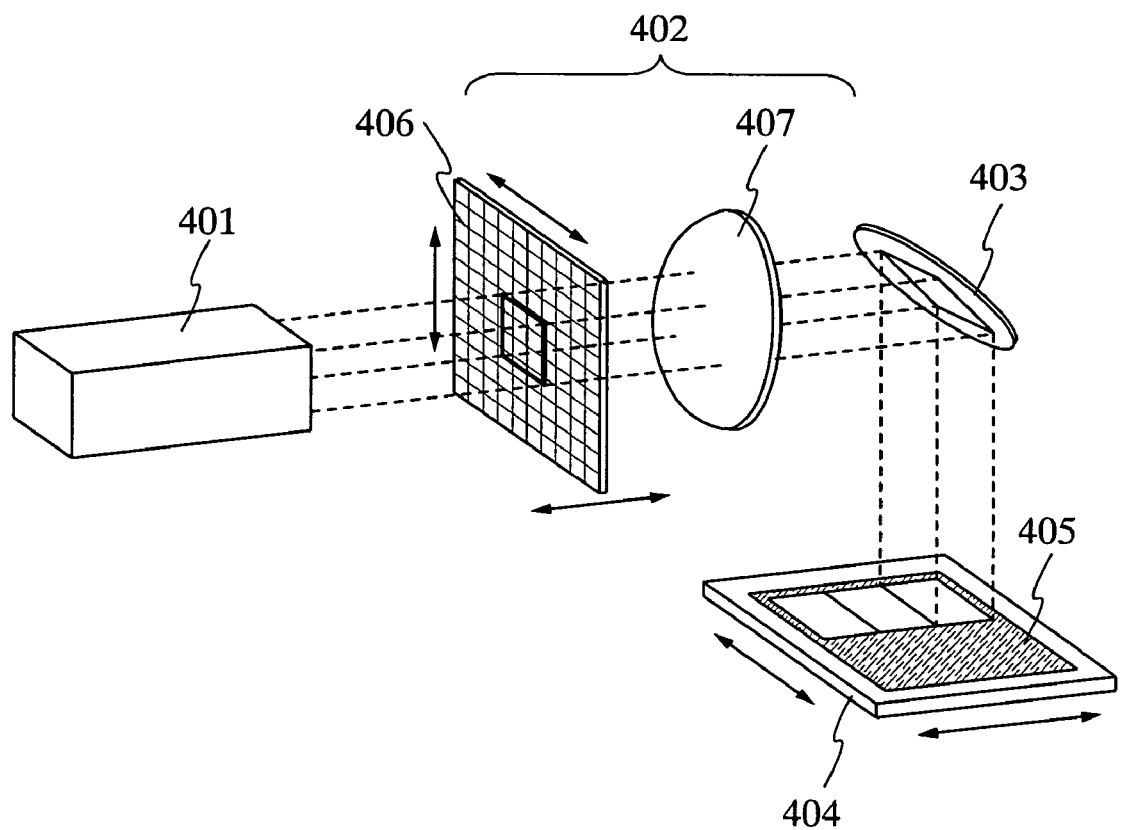
FIG. 5 is a drawing for showing a structure of the laser irradiation apparatus of the present invention.

It is noted that although a mirror is used as the optical system 403 for changing the direction of the optical path of the laser beam in FIG. 5, another optical system may be used instead of the mirror.

In addition, although not illustrated in FIG. 5, the laser irradiation apparatus of the present invention has means for controlling the position of the stage 404. It is noted that the laser irradiation apparatus shown in FIG. 5 uses a processing object moving method in which an irradiation position of the laser beam is fixed while the substrate 405 moves. However, the present invention is not limited to this method. An irradiation system moving method in which the substrate 405, which is the processing object, is fixed while the irradiation position of the laser beam moves may be also employed. Moreover, these two methods may be combined.

The beam homogenizer 402 has a lens array 406 having a plurality of convex lenses and a condenser lens 407 for shaping a laser beam emitted from each convex lens of the lens array 406. It is noted that although the number of condenser lenses 407 is one in FIG. 5, it may be more than one. And, although not illustrated in FIG. 5, the laser irradiation apparatus of the present invention has position control means for controlling the position of the lens array 406. It is possible to control the incidence position of the laser beam in the lens array 406 by controlling the position of the lens array 406.

It is noted that FIG. 5 shows the structure in which the incidence position of the laser beam in the lens array 406 is controlled by moving the lens array 406 from side to side and up and down in parallel to the plane perpendicular to the direction where the laser beam is incident. However, the present invention is not limited to this structure. For example, the lens array 406 may be moved back and forth in a direction parallel to the direction where the laser beam is incident.

Figure 6A:
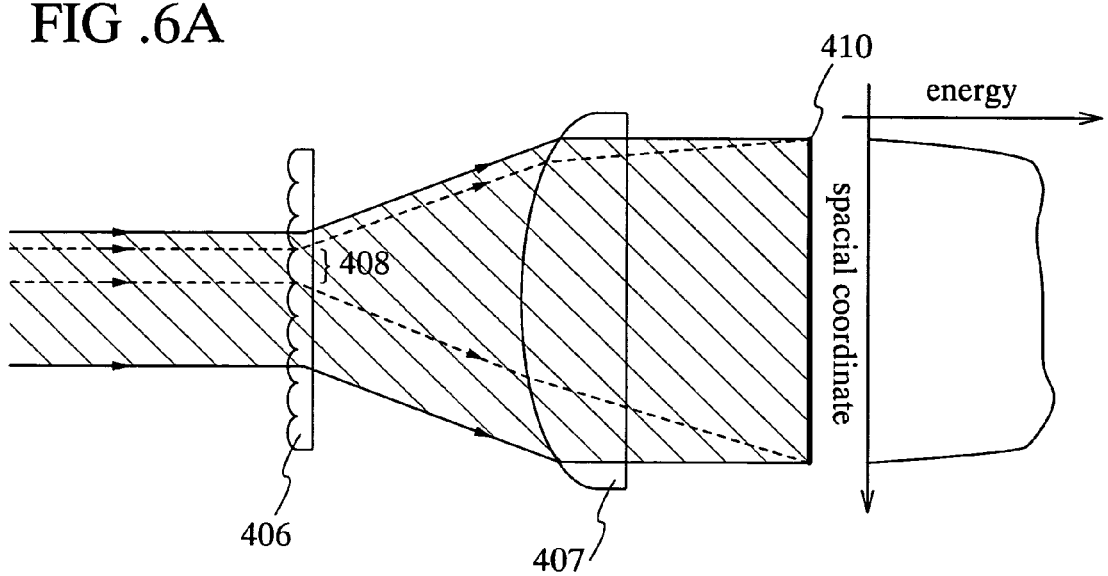
FIGS. 6A and 6B are drawings for showing the relation between the position of the lens array and the incidence position of the laser beam in the lens array and also for showing the energy distribution with respect to the incidence position.
Figure 6B:
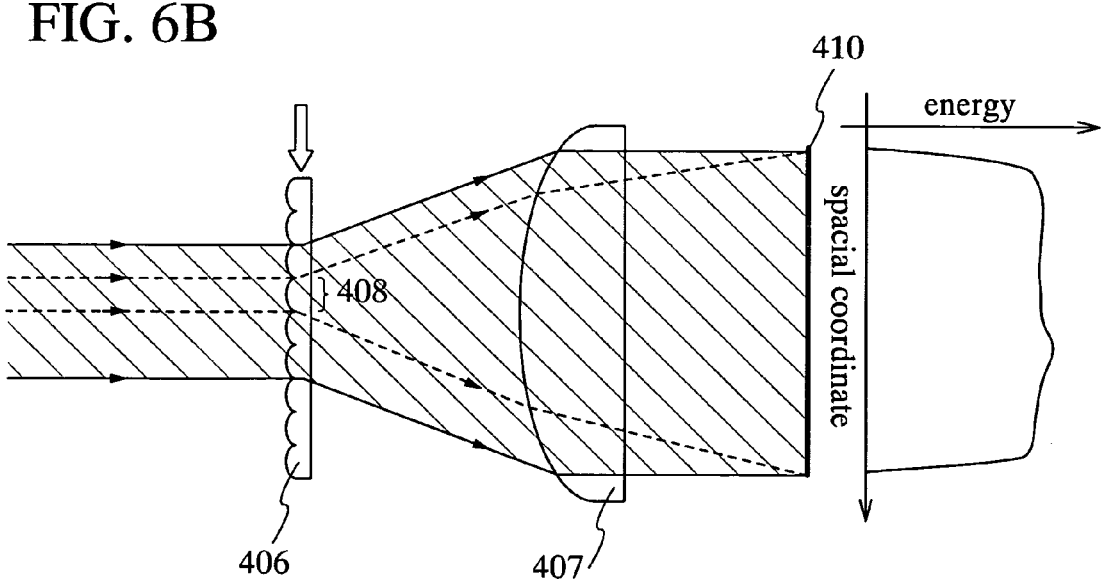

FIGS. 6A and 6B show the relation between the position of the lens array 406 and the incidence position of the laser beam in the lens array 406. FIGS. 6A and 6B also show the energy distribution of the laser beam at an area 410 with respect to the respective incidence positions.

As shown in FIGS. 6A and 6B, after the laser beam incident into the lens array 406 is divided by a plurality of lenses of the lens array 406, the laser beam is condensed at the area 410 by the condenser lens 407. When attention is paid to any lens 408 of the lens array 406, the laser beam incident into the lens 408 changes by moving the lens array 406 from the position shown in FIG. 6A to that shown in FIG. 6B. Therefore, when the energy distribution exists in the laser beam incident into the lens array 406, the energy distribution of the laser beam condensed at the area 410 changes by moving the lens array 406 from the position shown in FIG. 6A to that shown in FIG. 6B.

Figure 7A:
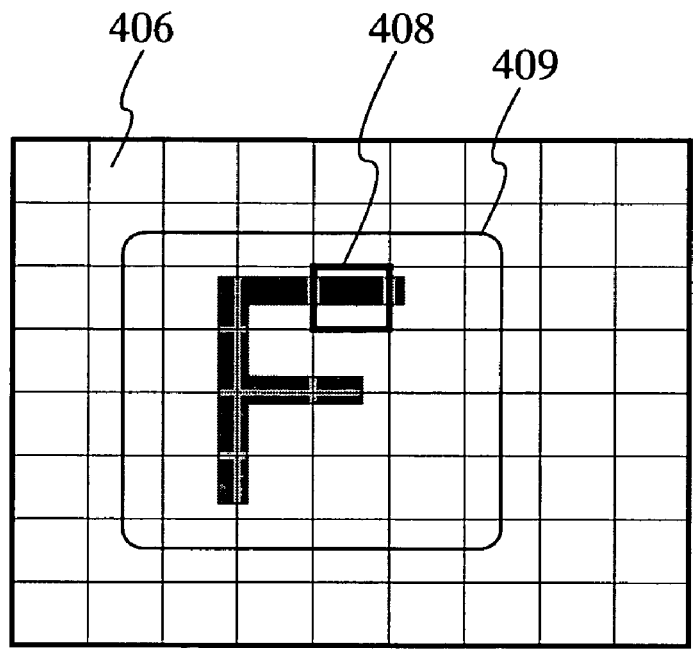
FIGS. 7A and 7B are drawings for showing the relation between the position of the lens array and the incidence position of the laser beam in the lens array observed from the direction where the laser beam is incident.
Figure 7B:
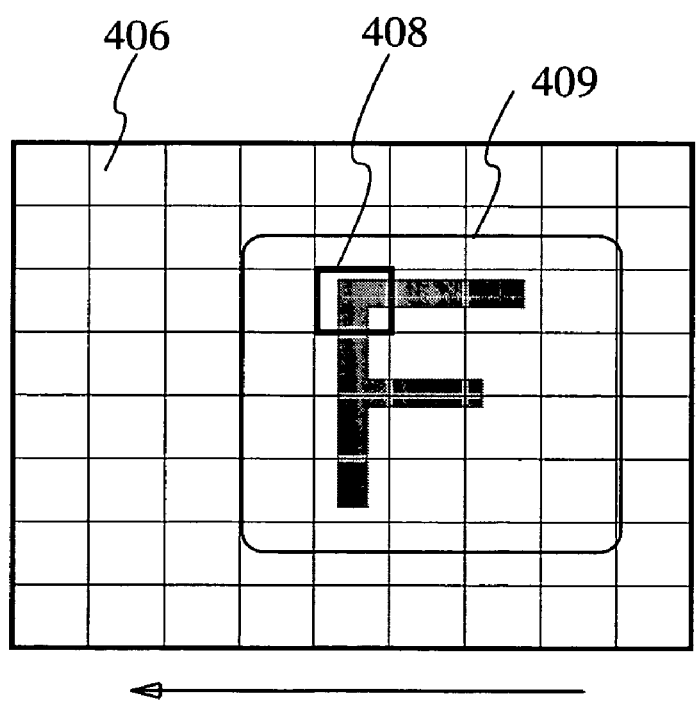

In order to make it easier to understand the change of the laser beam incident into the lens 408, FIGS. 7A and 7B show the relation between a position of the lens array 406 and an incidence position 409 of the laser beam in the lens array 406 observed from the direction where the laser beam is incident. It is noted that the incidence position 409 of the laser beam in the lens array 406 differs in FIGS. 7A and 7B. It is assumed that the energy distribution exists in the laser beam at the incidence position 409 of the laser beam in the lens array 406 as shown in FIGS. 7A and 7B. When attention is paid to the lens 408, it is understood that the energy distribution of the laser beam incident into the lens 408 differs in FIGS. 7A and 7B. Therefore, the energy distribution of the laser beam emitted from the beam homogenizer is different in FIGS. 7A and 7B.

Therefore, uniform laser annealing can be performed in such a way that the energy distribution is homogenized by irradiating the pulses having different spatial energy distributions respectively so as to overlap in the same region.

Figure 11:
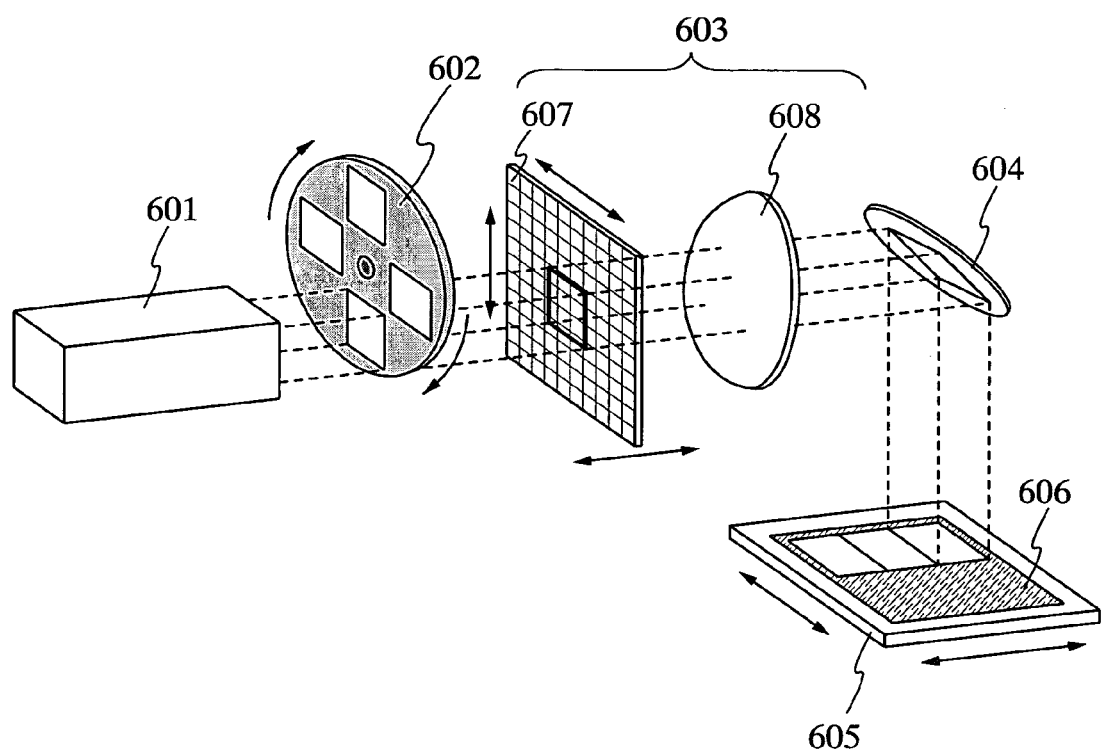
FIG. 11 is a drawing for showing a structure of the laser irradiation apparatus of the present invention.

The laser irradiation apparatus of the present invention may have a beam homogenizer in addition to the structure shown in FIG. 1A. And the beam homogenizer may have a structure shown in FIG. 5. FIG. 11 shows a structure of the laser irradiation apparatus of the present invention in which the structure shown in FIG. 1A is combined with the structure shown in FIG. 5.

The laser irradiation apparatus shown in FIG. 11 includes a laser oscillator 601 oscillating a pulsed laser beam, a lens assembly 602 including an optical system for inverting or rotating the spatial energy distribution of the pulse selected from the pulses of the pulsed laser beam oscillated from the laser oscillator 601, a beam homogenizer 603 into which the laser beam emitted from the lens assembly 602 is incident, an optical system 604 for changing the direction of the optical path of the laser beam emitted from the beam homogenizer 603 (a mirror is used as the optical system 604 in this embodiment mode), and a stage 605 for mounting a processing object 606 (herein means a substrate with a semiconductor film formed thereover).

In addition, though not illustrated in FIG. 11, the laser irradiation apparatus of the present invention has means for controlling the position of the stage 605. It is noted that the laser irradiation apparatus shown in FIG. 11 uses the processing object moving method in which an irradiation position of the laser beam is fixed which the substrate 606 moves. However, the present invention is not limited to this method. The irradiation system moving method in which the substrate 606, which is the processing object, is fixed while the irradiation position of the laser beam moves may be employed. Moreover, these two methods may be combined.

As well as in FIG. 1A, the lens assembly 602 has a plurality of optical systems for inverting or rotating the energy distribution of the laser beam. The lens assembly 602 is rotated to control the incidence position of the laser beam so that any one optical system is selected from the plurality of optical systems in the lens assembly 602. Although not illustrated in FIG. 11, the laser irradiation apparatus of the present invention has position control means for controlling the incidence position of the laser beam in the lens assembly 602. The optical system selected from the lens assembly 602 controls the energy distribution of the laser beam on the irradiated surface.

It is noted that although the incidence position of the laser beam in the lens assembly 602 is controlled by rotating the lens assembly 602 in FIG. 11, the present invention is not limited to this structure. The present invention may have any structure when a plurality of optical systems can be selected in synchronization with the frequency of the pulsed laser beam.

The beam homogenizer 603 has a lens array 607 having a plurality of convex lenses and a condenser lens 608 for irradiating the laser beam emitted from the respective convex lenses of the lens array 607 to the same region. Although the number of condenser lenses 608 is one in FIG. 11, it may be more than one. The laser irradiation apparatus of the present invention has position control means for controlling the position of the lens array 607 though it is not illustrated in FIG. 11. The incidence position of the laser beam in the lens array 607 can be controlled by controlling the position of the lens array 607.

In FIG. 11, the incidence position of the laser beam in the lens array 607 is controlled by moving the lens array 607 from side to side and up and down in parallel to the plane perpendicular to the direction where the laser beam is incident. However, the present invention is not limited to this structure. For example, the lens array 607 may be moved back and forth in a direction parallel to the direction where the laser beam is incident.

As shown in FIG. 11, the total energy distribution of the laser beam irradiated to the same region can be homogenized further by combining the structures shown in FIGS. 1A and 5.

EMBODIMENT 1

The present embodiment explains a method for manufacturing a semiconductor film using the laser irradiation apparatus of the present invention in detail.

Figure 8A:
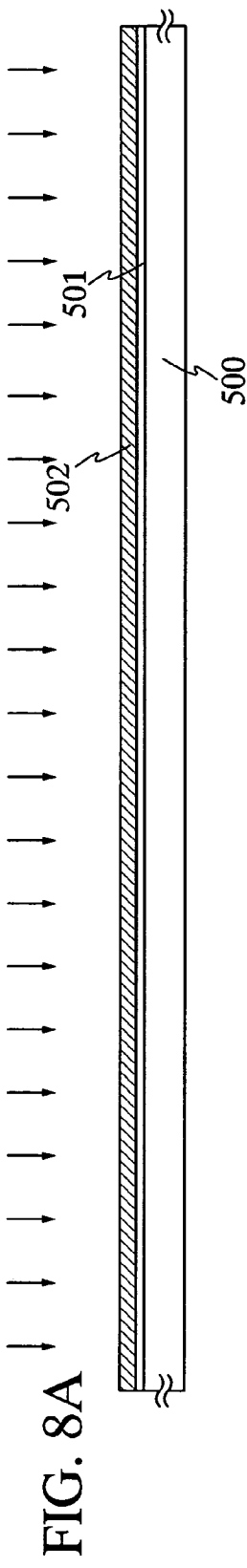
FIGS. 8A to 8D are drawings for showing a method for manufacturing a semiconductor device of the present invention.

Initially, a base film 501 is formed over a substrate 500 as shown in FIG. 8A. A glass substrate made of a barium borosilicate glass or an alumino borosilicate glass, a quartz substrate, an SUS substrate, or the like can be used as the substrate 500 for example. In addition, although a substrate made of flexible synthetic resin such as plastic is generally inferior in heat resistance to the above substrate, this substrate can be used when it can resist the temperature in the manufacturing process.

The base film 501 is provided in order to prevent that alkali-earth metal or alkali metal such as Na included in the substrate 500 diffuses into the semiconductor film to have an adverse affect on the characteristic of a semiconductor element. Therefore, the base film 501 is formed of an insulating film such as a silicon oxide film, a silicon nitride film, or a silicon nitride oxide film which can suppress the diffusion of the alkali-earth metal and alkali metal into the semiconductor film. In this embodiment, a silicon nitride oxide film is formed in thickness from 10 nm to 400 nm (preferably from 50 nm to 300 nm) by a plasma CVD method.

In addition, the base film 501 may be formed in a single-layer structure or in a multi-layer structure in which a plurality of insulating films is laminated. In addition, in the case of using the substrate including the alkali metal or the alkali-earth metal in any way such as the glass substrate, the SUS substrate, or the plastic substrate, it is effective to provide the base film in terms of preventing the diffusion of the impurity. When the diffusion of the impurity does not lead to any significant problems, for example when the quartz substrate is used, the base film is not always necessary to be provided.

Next, a semiconductor film 502 is formed on the base film 501 in thickness from 25 nm to 100 nm (preferably from 30 nm to 60 nm). The semiconductor film 502 may be an amorphous semiconductor or may be a poly-crystalline semiconductor. Moreover, not only silicon but also silicon germanium may be employed as the semiconductor. When silicon germanium is used, the concentration of germanium is preferably in the range of approximately 0.01 atomic % to 4.5 atomic %.

Figure 8B:
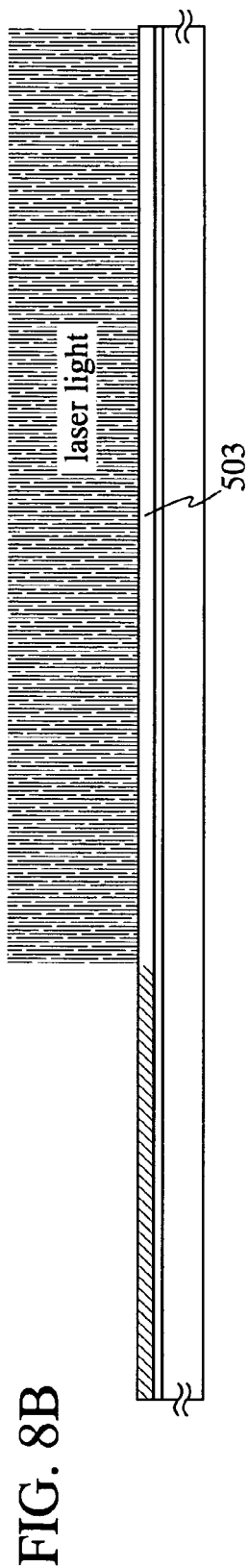

Next, the semiconductor film 502 is crystallized using a laser irradiation apparatus of the present invention as shown in FIG. 8B. In the present invention, a known pulsed gas laser or solid-state laser can be used. For example, there are a YAG laser, a YVO$_4$ laser, a YLF laser, a YAlO$_3$ laser, a GdVO$_4$ laser, a glass laser, a ruby laser, an alexandrite laser, a Ti: Sapphire laser, and the like, each of which is doped with Cr, Nd, Er, Ho, Ce, Co, Ti, or Tm. The fundamental wavelength of these lasers depends on the doped material, and the laser beam having a fundamental wavelength of approximately 1 μm is obtained. A second harmonic, a third harmonic, and a fourth harmonic with respect to the fundamental wave can be obtained by using a non-linear optical element.

In the present embodiment, an excimer laser (manufactured by Sopra, Inc.) is used that can irradiate a region having a size from several to several tens cm$^2$ (3×5 cm$^2$ in this embodiment) with one pulse of a pulsed laser beam having a wavelength of 308 nm. The laser beam is irradiated to any region for every several shots (4 shots in this embodiment) under the condition where the energy density in the beam spot is set in the range of 400 mJ/cm$^2$ to 900 mJ/cm$^2$ (600 mJ/cm$^2$ in this embodiment), the pulse width is set to 170 ns, and the pulse repetition rate is set in the range of 1 Hz to 30 Hz (20 Hz in this embodiment).

Moreover, in the present invention, the energy distribution of at least one pulse among a plurality of pulses of a pulsed laser beam irradiated to any region is made different from those of the other pulses. With the above structure, the total energy distribution can be homogenized, thereby further homogenizing the crystallinity of the semiconductor film.

Thus, the laser irradiation to the semiconductor film 502 forms a semiconductor film 503 in which the crystallinity is further enhanced.

Figure 8C:
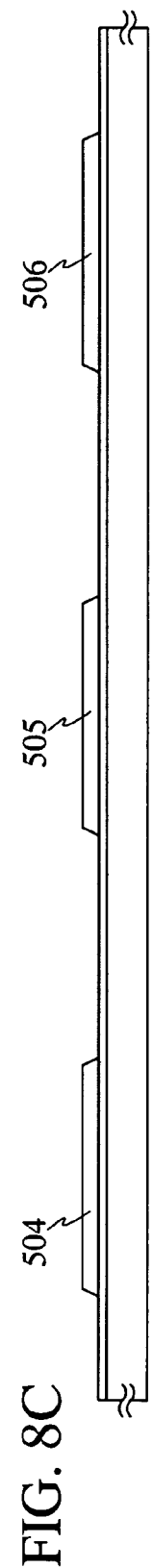
Figure 8D:
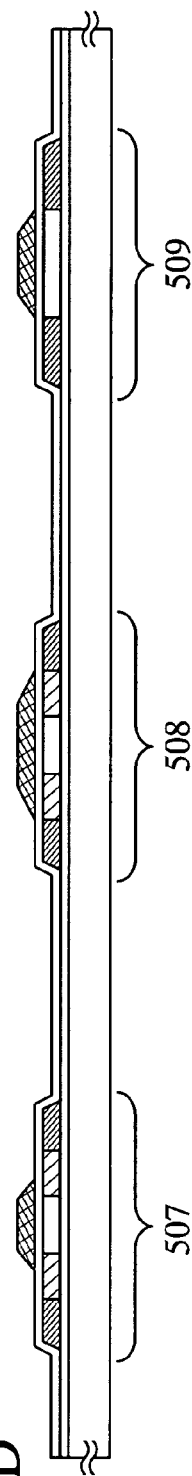

Then, the semiconductor film 503 is patterned and island-shaped semiconductor films 504 to 506 are formed as shown in FIG. 8C. When TFTs 507 to 509 are formed using the island-shaped semiconductor films 504 to 506 as shown in FIG. 8D, it is possible to suppress the variation in the characteristic of TFT such as on-current and mobility.

Moreover, when the size of the beam spot is enlarged so as to cover the whole pixel portion of the semiconductor display device, it is possible to suppress the visible variation in brightness due to the fluctuation of the power by several % between the pulses of the pulsed laser beam.

EMBODIMENT 2

The present embodiment explains the order of a plurality of pulses of a pulsed laser beam having different energy distributions respectively to irradiate the processing object.

Figure 9A:
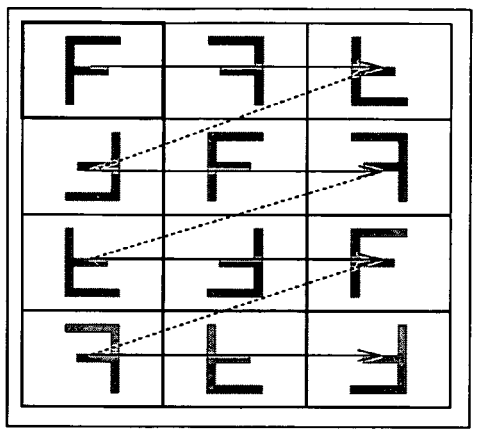
FIGS. 9A to 9D are drawings for showing the irradiation order of the pulsed laser beams to each region in the processing object.
Figure 9B:
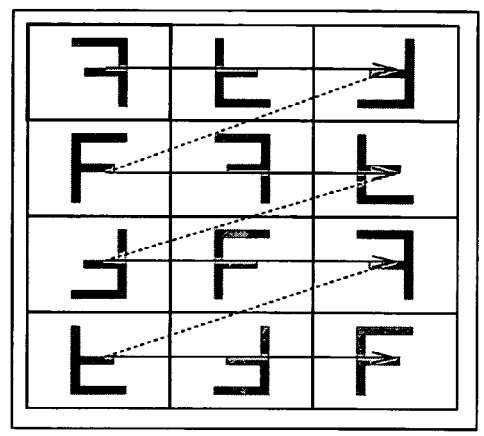
Figure 9C:
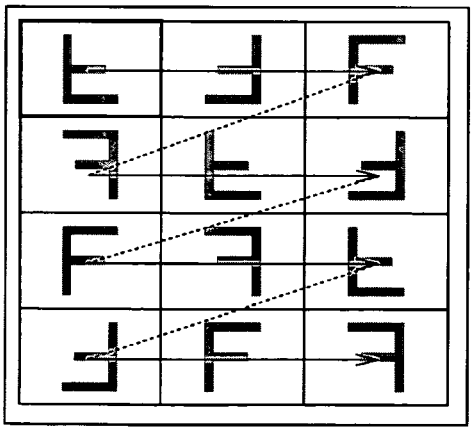
Figure 9D:
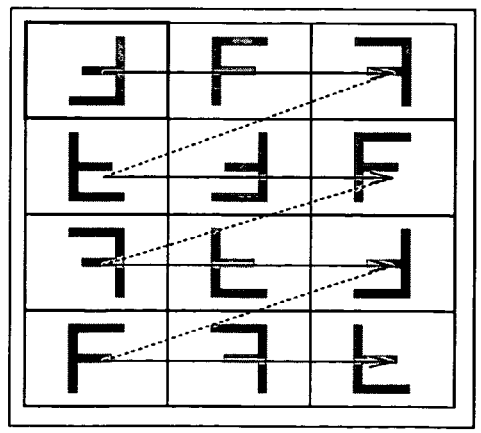

In this embodiment, it is assumed that a first pulse of a pulsed laser beam is irradiated to each region in the processing object sequentially as indicated by an arrow in FIG. 9A. Then, a second pulse of the pulsed laser beam is irradiated to each region in the processing object sequentially as indicated by an arrow in FIG. 9B. And a third pulse of the pulsed laser beam is irradiated to each region in the processing object sequentially as indicated by an arrow in FIG. 9C. Lastly, a fourth pulse of the pulsed laser beam is irradiated to each region in the processing object sequentially as indicated by an arrow in FIG. 9D.

And, the second to the fourth pulses of the pulsed laser beams are irradiated so as to have the different energy distributions respectively in the adjacent regions as well as the first pulse of the pulsed laser beam.

The present embodiment shows the example in which the four pulses of the pulsed laser beam are irradiated to each region. However, the number of pulses to be irradiated to the same region is not limited to four and the number thereof may be more than one.

EMBODIMENT 3

This embodiment explains the order of a plurality of pulses of a pulsed laser beam having different energy distributions respectively to irradiate the processing object.

Figure 10A:
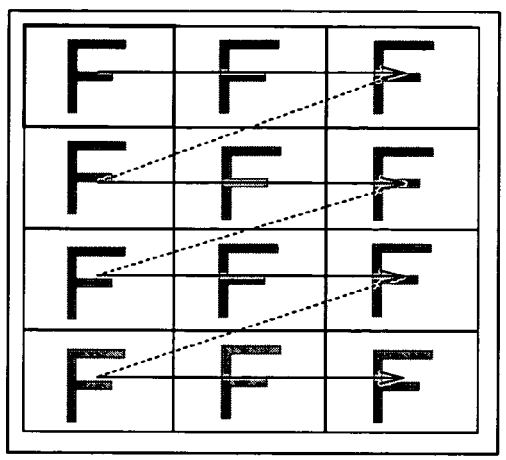
FIGS. 10A to 10D are drawings for showing the irradiation order of the pulsed laser beams to each region in the processing object.

In this embodiment, it is assumed that a first pulse of a pulsed laser beam is irradiated to each region in the processing object sequentially as indicated by an arrow in FIG. 10A. It is noted that the pulsed laser beam has the same energy distribution in the adjacent areas in FIG. 10A.

Figure 10B:
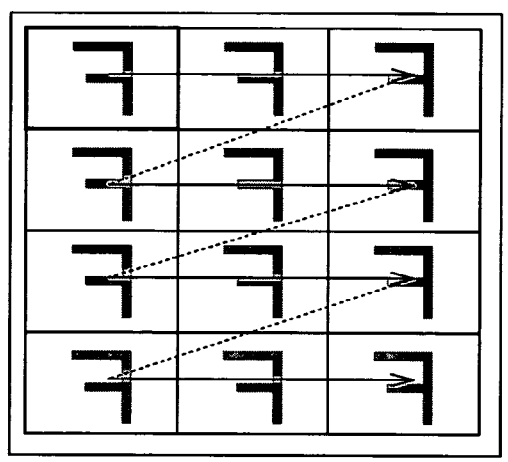
Figure 10C:
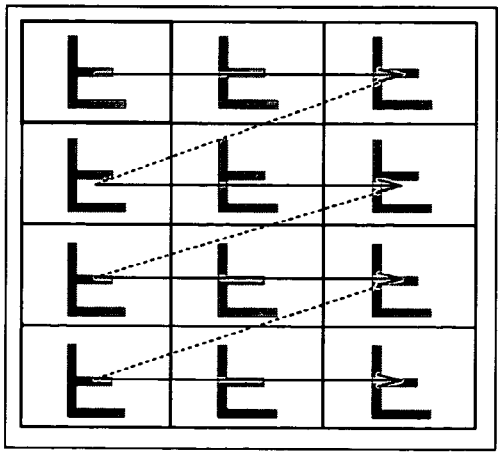
Figure 10D:
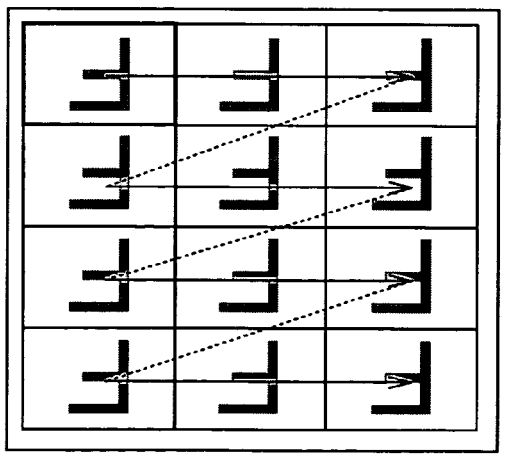

Then, a second pulse of the pulsed laser beam is irradiated to each region in the processing object sequentially as indicated by an arrow in FIG. 10B. And a third pulse of the pulsed laser beam is irradiated to each region in the processing object sequentially as indicated by an arrow in FIG. 10C. Lastly, a fourth pulse of the pulsed laser beam is irradiated to each region in the processing object sequentially as indicated by an arrow in FIG. 10D.

Although the present embodiment shows the example where the four pulses of the pulsed laser beam are irradiated to each region, the number of pulses of the pulsed laser beam to be irradiated to the same region is not limited to this and it may be more than one.

In the present embodiment, four pulses of the pulsed laser beam irradiated to each region have the different energy distributions respectively as shown in FIGS. 10A to 10D. In the present embodiment, all the pulses of the pulsed laser beam are not irradiated to the same region continuously. After irradiating one pulse of the pulsed laser beam to a region, the pulse of the pulsed laser beam is irradiated to another region, and the next pulse of the pulsed laser beam is irradiated to the former region again. When the laser irradiation is performed according to the order shown in the present embodiment, there is an advantage that it is possible to suppress the operation frequency of the means for controlling the position of the lens assembly and to suppress the operation frequency of the means for controlling the position of the lens array compared with the embodiment 2.

What is claimed is:

1. A laser irradiation apparatus comprising:
a laser oscillator sequentially emitting a plurality of first pulses of a laser beam;
a lens assembly having a plurality of optical systems; and
position control means for controlling a position of the lens assembly so that the plurality of first pulses sequentially pass through at least two of the plurality of optical systems to form a plurality of second pulses,
wherein at least one of the plurality of second pulses has a spatial energy distribution which is inverted or rotated in relation to a spatial energy distribution of the plurality of first pulses.

2. The laser irradiation apparatus according to claim 1, wherein the laser oscillator uses a laser selected from the group consisting of an excimer laser, a glass laser, a YAG laser, a YVO$_4$ laser, and a GdVO$_4$ laser.

3. The laser irradiation apparatus according to claim 1, wherein the lens assembly has a cylindrical lens or a plano-convex spherical lens.

4. A laser irradiation apparatus comprising:
a laser oscillator sequentially emitting a plurality of first pulses of a laser beam;
a lens assembly having a plurality of optical systems;
position control means for controlling a position of the lens assembly so that the plurality of first pulses sequentially pass through at least two of the plurality of optical systems to form a plurality of second pulses; and
a beam homogenizer,
wherein at least one of the plurality of second pulses has a spatial energy distribution which is inverted or rotated in relation to a spatial energy distribution of the plurality of first pulses, and
wherein the plurality of second pulses are irradiated to a same region after the spatial energy distribution is homogenized by the beam homogenizer.

5. The laser irradiation apparatus according to claim 4, wherein the laser oscillator uses a laser selected from the group consisting of an excimer laser, a glass laser, a YAG laser, a YVO$_4$ laser, and a GdVO$_4$ laser.

6. The laser irradiation apparatus according to claim 4, wherein the lens assembly has a cylindrical lens or a plano-convex spherical lens.

7. A laser irradiation apparatus comprising:
a laser oscillator sequentially emitting a plurality of first pulses of a laser beam;
a lens assembly having a plurality of optical systems; and
position control means for controlling a position of the lens assembly beam, so that the plurality of first pulses sequentially pass through at least two of the plurality of optical systems to form a plurality of second pulses,
wherein one of the plurality of second pulses has a spatial energy distribution which is inverted along a first straight line in relation to a spatial energy distribution of the plurality of first pulses.
wherein another one of the plurality of second pulses has a spatial energy distribution which is inverted along a second straight line in relation to a spatial energy distribution of the plurality of first pulses, and
wherein the first straight line and the second straight line intersect each other.

8. The laser irradiation apparatus according to claim 7, wherein the laser oscillator uses a laser selected from the group consisting of an excimer laser, a glass laser, a YAG laser, a YVO$_4$ laser, and a GdVO$_4$ laser.

9. The laser irradiation apparatus according to claim 7, wherein the lens assembly has a cylindrical lens or a plano-convex spherical lens.

10. A laser irradiation apparatus comprising:
a laser oscillator sequentially emitting a plurality of first pulses of a laser beam;
a lens assembly having a plurality of optical systems;
position control means for controlling a position of the lens assembly so that the plurality of first pulses sequentially pass through at least two of the plurality of optical systems to form a plurality of second pulses; and
a beam homogenizer,
wherein one of the plurality of second pulses has a spatial energy distribution which is inverted along a first straight line in relation to a spatial energy distribution of the plurality of first pulses.
wherein another one of the plurality of second pulses has a spatial energy distribution which is inverted along a second straight line in relation to a spatial energy distribution of the plurality of first pulses.
wherein the plurality of second pulses are irradiated to a same region after the spatial energy distribution is homogenized by the beam; homogenizer, and
wherein the first straight line and the second straight line intersect each other.

11. The laser irradiation apparatus according to claim 10, wherein the laser oscillator uses a laser selected from the group consisting of an excimer laser, a glass laser, a YAG laser, a YVO$_4$ laser, and a GdVO$_4$ laser.

12. The laser irradiation apparatus according to claim 10, wherein the lens assembly has a cylindrical lens or a plano-convex spherical lens.

13. A laser irradiation method comprising the steps of:

selecting at least two optical systems from a plurality of optical systems in a lens assembly in synchronization with oscillations of a plurality of first pulses of a pulsed laser beam sequentially emitted from a laser oscillator; and forming a plurality of second pulses by sequentially passing the plurality of first pulses through the selected optical systems, wherein at least one of the plurality of second pulses has a spatial energy distribution which is inverted or rotated in relation to a spatial energy distribution of the plurality of first pulses.

14. The laser irradiation method according to claim 13, wherein the laser oscillator uses a laser selected from the group consisting of an excimer laser, a glass laser, a YAG laser, a YVO$_4$ laser, and a GdVO$_4$ laser.

15. The laser irradiation method according to claim 13, wherein the lens assembly has a cylindrical lens or a plano-convex spherical lens.

16. A laser irradiation method comprising the steps of:

selecting a plurality of optical systems in a lens assembly in synchronization with oscillations of a plurality of first pulses of a pulsed laser beam sequentially emitted from a laser oscillator;

forming a plurality of second pulses by sequentially passing the plurality of first pulses through the selected optical systems; and irradiating the plurality of second pulses to a same region, wherein at least one of the plurality of second pulses has a spatial energy distribution which is inverted or rotated in relation to a spatial energy distribution of the plurality of first pulses.

17. The laser irradiation method according to claim 16, wherein the laser oscillator uses a laser selected from the group consisting of an excimer laser, a glass laser, a YAG laser, a YVO$_4$ laser, and a GdVO$_4$ laser.

18. The laser irradiation method according to claim 16, wherein the lens assembly has a cylindrical lens or a plano-convex spherical lens.

19. A laser irradiation method comprising the steps of:

selecting a plurality of optical systems in a lens assembly in synchronization with oscillations of a plurality of first pulses of a pulsed laser beam sequentially emitted from a laser oscillator; and forming a plurality of second pulses by sequentially passing the plurality of first pulses through the selected optical systems, wherein one of the plurality of second pulses has a spatial energy distribution which is inverted along a first straight line in relation to the plurality of first pulses, wherein another one of the plurality of second pulses has a spatial energy distribution which is inverted along a second straight line in relation to the plurality of first pulses, and wherein the first straight line and the second straight line intersect each other.

20. The laser irradiation method according to claim 19, wherein the laser oscillator uses a laser selected from the group consisting of an excimer laser, a glass laser, a YAG laser, a YVO$_4$ laser, and a GdVO$_4$ laser.

21. The laser irradiation method according to claim 19, wherein the lens assembly has a cylindrical lens or a plano-convex spherical lens.

22. A laser irradiation method comprising the steps of:

selecting a plurality of optical systems in a lens assembly in synchronization with oscillations of a plurality of first pulses of a pulsed laser beam sequentially emitted from a laser oscillator;

forming a plurality of second pulses by sequentially passing the plurality of first pulses through the selected optical systems; and irradiating the plurality of second pulses to a same region, wherein one of the plurality of second pulses has a spatial energy distribution which is inverted along a first straight line in relation to the plurality of first pulses, wherein another one of the plurality of second pulses has a spatial energy distribution which is inverted along a second straight line in relation to the plurality of first pulses, and wherein the first straight line and the second straight line intersect each other.

23. The laser irradiation method according to claim 22, wherein the laser oscillator uses a laser selected from the group consisting of an excimer laser, a glass laser, a YAG laser, a YVO$_4$ laser, and a GdVO$_4$ laser.

24. The laser irradiation method according to claim 22, wherein the lens assembly has a cylindrical lens or a plano-convex spherical lens.

25. A method for manufacturing a semiconductor device comprising the steps of:

selecting a plurality of optical systems in a lens assembly in synchronization with oscillations of a plurality of first pulses of a pulsed laser beam sequentially emitted from a laser oscillator;

forming a plurality of second pulses by sequentially passing the plurality of first pulses through the selected optical systems; and irradiating the plurality of second pulses to a same region in a semiconductor film, wherein at least one of the plurality of second pulses has a spatial energy distribution which is inverted or rotated in relation to a spatial energy distribution of the plurality of first pulses.

26. The method for manufacturing a semiconductor device according to claim 25, wherein the laser oscillator uses a laser selected from the group consisting of an excimer laser, a glass laser, a YAG laser, a YVO$_4$ laser, and a GdVO$_4$ laser.

27. The method for manufacturing a semiconductor device according to claim 25, wherein the lens assembly has a cylindrical lens or a plano-convex spherical lens.

28. The method for manufacturing a semiconductor device according to claim 25, wherein the semiconductor film is formed over a glass substrate.

29. The method for manufacturing a semiconductor device according to claim 25, wherein the semiconductor film comprises silicon.

30. A method for manufacturing a semiconductor device comprising the steps of:

selecting a plurality of optical systems in a lens assembly in synchronization with oscillations of a plurality of first pulses of a pulsed laser beam sequentially emitted from a laser oscillator;

forming a plurality of second pulses by sequentially passing the plurality of first pulses through the selected optical systems; and irradiating the plurality of second pulses to a same region in a semiconductor film, wherein one of the plurality of second pulses has a spatial energy distribution which is inverted along a first straight line in relation to the plurality of first pulses.

wherein another one of the plurality of second pulses has a spatial energy distribution which is inverted along a second straight line in relation to the plurality of first pulses, and wherein the first straight line and the second straight line intersect each other.

31. The method for manufacturing a semiconductor device according to claim 30, wherein the laser oscillator uses a laser selected from the group consisting of an excimer laser, a glass laser, a YAG laser, a $YVO_4$ laser, and a $GdVO_4$ laser.

32. The method for manufacturing a semiconductor device according to claim 30, wherein the lens assembly has a cylindrical lens or a plano-convex spherical lens.

33. The method for manufacturing a semiconductor device according to claim 30, wherein the semiconductor film is formed over a glass substrate.

34. The method for manufacturing a semiconductor device according to claim 30, wherein the semiconductor film comprises silicon.

* * * * *